United States Patent
Kessler

(10) Patent No.: US 11,762,181 B2
(45) Date of Patent: Sep. 19, 2023

(54) SCANNING MICROSCOPE WITH ENHANCED FOV AND NA

(71) Applicant: David Kessler, Rochester, NY (US)

(72) Inventor: David Kessler, Rochester, NY (US)

(73) Assignee: Kessler Optics and Photonics Solutions Ltd., Rochester, NY (US)

( * ) Notice: Subject to any disclaimer, the term of this patent is extended or adjusted under 35 U.S.C. 154(b) by 285 days.

(21) Appl. No.: 17/116,123

(22) Filed: Dec. 9, 2020

(65) Prior Publication Data

US 2021/0199943 A1 Jul. 1, 2021

Related U.S. Application Data

(60) Provisional application No. 62/953,671, filed on Dec. 26, 2019.

(51) Int. Cl.
G02B 21/00 (2006.01)
G02B 5/10 (2006.01)

(52) U.S. Cl.
CPC .......... G02B 21/0048 (2013.01); G02B 5/10 (2013.01)

(58) Field of Classification Search
CPC .............................. G02B 21/0048; G02B 5/10
USPC ................... 359/213.1, 196.1, 237, 618, 838
See application file for complete search history.

(56) References Cited

U.S. PATENT DOCUMENTS

| | | | |
|---|---|---|---|
| 3,748,015 A | 7/1973 | Offner | |
| 4,058,736 A * | 11/1977 | Takahashi | G01N 21/9027 356/427 |
| 5,233,454 A * | 8/1993 | Sakuma | G02B 5/10 359/218.1 |
| 7,324,272 B1 * | 1/2008 | Deck | G01J 3/02 359/385 |
| 2012/0307328 A1 * | 12/2012 | Kessler | G02B 26/105 359/729 |
| 2015/0160456 A1 * | 6/2015 | Hicks | G02B 5/10 359/868 |
| 2017/0059485 A1 * | 3/2017 | Yamamoto | G01N 15/1434 |
| 2017/0123196 A1 * | 5/2017 | Svoboda | H04N 23/56 |
| 2017/0199362 A1 * | 7/2017 | Schwedt | G02B 21/002 |
| 2019/0204757 A1 * | 7/2019 | Brussaard | G03F 7/70625 |
| 2020/0081237 A1 * | 3/2020 | Wald | G02B 27/0068 |
| 2022/0011677 A1 * | 1/2022 | Dietrich | B29C 59/16 |
| 2022/0146843 A1 * | 5/2022 | Haigh | G02B 27/1066 |

OTHER PUBLICATIONS

Riedl "Designing with Toroids", From oemagazine Nov./Dec. 2004, Jan. 1, 2004.*

(Continued)

*Primary Examiner* — William R Alexander
*Assistant Examiner* — Sharrief I Broome
(74) *Attorney, Agent, or Firm* — Louis S. Horvath

(57) ABSTRACT

An optical apparatus for imaging a sample has a scanning apparatus having a laser energizable to direct an input beam of a first wavelength to a reflective scanner that is rotatable about an axis and a toroidal mirror surface that is symmetric about said axis and is disposed to direct scanned laser light of the first wavelength toward the sample in an arcuate scan pattern. A compensator in the path of the input beam is formed to correct one or more aberrations of the toroidal mirror surface. Telecentric collector optics define a collection path that conveys, to a detector, scanned light of a second wavelength that is excited from the scanned sample.

20 Claims, 26 Drawing Sheets

(56) References Cited

OTHER PUBLICATIONS

Fan, Jingtao., Suo, Jinli, et al. "Video-rate imaging of biological dynamics at centimetre scale and micrometre resolution", Nature Photonics 13, pp. 809-816 (2019). Online at https:// address: doi.org/10.1038/s41566-019-0474-7.
Jonathan Bumstead, "Designing a large field-of-view two photon microscope using optical invariant analysis" Neurophotonics, Apr.-Jun. 2018 vol. 5(2); pp. 025001-1 to 025001-20.
Fabian F Voigt et. al., "A modular two-photon microscope for simultaneous imaging of distant cortical areas in vivo", Multiphoton Microscopy in the Biomedical Sciences XV, edited by Ammasi Periasamy, Proc. of SPIE vol. 9329, 93292C-1 to -7.
Philbert S. Tsai, et. al., "Ultra-large field-of-view two-photon microscopy" Optics Express 13833 Jun. 1, 2015 | vol. 23, No. 11; pp. 13833-13847.
Sinefeld D. et al. "Nonlinear Adaptive Optics: Aberration Correction in Three Photon Fluorescence Microscopy for Brain Imaging." Proc. of SPIE vol. 10073, 1007314-1 to -7.
Vincent Hahn, Frederik Mayer et. al in "3D Laser Nanoprinting" Optics and Photonics News, Oct. 2019, pp. 28-36.

\* cited by examiner

Design example for scanner optics (first part)

| Surf | | Type | Radius | Thickness | Glass | Clear Diam | |
|---|---|---|---|---|---|---|---|
| OBJ | | STANDARD | Infinity | Infinity | | 0 | ** |
| 1 | | STANDARD | Infinity | 32 | | 63.47463 | ** |
| 2 | | COORDBRK | - | 0 | | - | |
| 3 | Input cyl | TOROIDAL | 102.1162 | 12 | SILICA | 63.47463 | ** |
| 4 | | STANDARD | Infinity | 5 | SILICA | 65.19248 | ** |
| 5 | Corrector STO | EVENASPH | Infinity | 12 | SILICA | 60 | ** |
| 6 | | XPOLYNOM | Infinity | 37.95 | | 66.74016 | ** |
| 7 | | COORDBRK | - | 0 | | - | |
| 8 | Input fold mirror | STANDARD | Infinity | 0 | MIRROR | 65.28406 | ** |
| 9 | | COORDBRK | - | -55 | | - | |
| 10 | System about x tilt | COORDBRK | - | 0 | | - | |
| 11 | Incidence | COORDBRK | - | 0 | | - | |
| 12 | Scan | COORDBRK | - | 0 | | - | |

• ** Conic 0

*FIG. 8A*

Design example for scanner optics (last part)

| | | | | |
|---|---|---|---|---|
| Scan mirror plane 13 | STANDARD | Infinity | 0 | MIRROR | 85.31126 |
| De-scan 14 | COORDBRK | - | 0 | - | - |
| Bend 15 | COORDBRK | - | 0 | - | - |
| Chg axis sym - opt 16 | COORDBRK | - | 33.04954 | - | - |
| Q-type asph scan 17 | QED_TYPE | -161.3123 | -56.2795 | MIRROR | 133.5755 * |
| 18 | COORDBRK | - | 0 | - | - |
| Cranial cover 19 | STANDARD | Infinity | -0.5 | SILICA | 0.7600000 ** |
| Brain 20 | STANDARD | Infinity | -0.3 | 1.333044, | 0.3816411 ** |
| | | | 55.794322 | | |
| 21 | STANDARD | Infinity | -20 | | 0.1307478 ** |
| 22 | STANDARD | Infinity | 20 | | 23.82239 |
| IMA | STANDARD | Infinity | | | 0.1307478 ** |

- * Conic 3.325256
- ** Conic 0

*FIG. 8B*

Detailed data for the toroidal/aspheric mirror

This surface is an aspheric, Q-Type with the following coefficients:

```
Surface Type         :  1
Maximum term #       :  9
Normalization Radius :  66.764255
A0                   :  -10.775114
A1                   :  0.14556773
A2                   :  -0.42345087
A3                   :  0.07163342
A4                   :  -0.054397064
A5                   :  0.017753428
A6                   :  -0.005444511152
A7                   :  0.000051642234
A8                   :  -0.00014408493
```

*FIG. 9*

Toroidal surfaces 3 and 5, part of the compensator

```
Surface   3 TOROIDAL
Extrapolate?                  :         0
Radius of Rotation            :    -173.85796
Coefficient on y^2            :   -0.000329280878
Coefficient on y^4            :    3.3036394e-06
Coefficient on y^6            :   -5.3166296e-10
Coefficient on y^8            :   -9.4173435e-13
Coefficient on y^10           :    8.9202049e-16
Coefficient on y^12           :   -5.0636323e-19
Coefficient on y^14           :         0
Number of terms               :         7
Normalization Radius          :       100

Surface STO EVENASPH corrector
Coefficient on r^ 2           :    0.0045596283
Coefficient on r^ 4           :   -1.1576116e-06
Coefficient on r^ 6           :    3.0027027e-10
Coefficient on r^ 8           :   -1.3742832e-13
Coefficient on r^10           :    9.0247116e-17
Coefficient on r^12           :   -7.8286682e-20
Coefficient on r^14           :    2.0772537e-23
Coefficient on r^16           :         0
```

FIG. 10

Normalization Radius    20
Coefficient on X1Y0     0
Coefficient on X0Y1     0
Coefficient on X2Y0    -0.47056177
Coefficient on X1Y1     0
Coefficient on X0Y2    -0.64015247
Coefficient on X3Y0     0
Coefficient on X2Y1    -0.20949055
Coefficient on X1Y2     0
Coefficient on X0Y3     0.20158167
Coefficient on X4Y0    -0.158717
Coefficient on X3Y1     0
Coefficient on X2Y2    -0.47097255
Coefficient on X1Y3     0
Coefficient on X0Y4     0.61649221
Coefficient on X5Y0     0
Coefficient on X4Y1    -0.020928768
Coefficient on X3Y2     0
Coefficient on X2Y3     0.025337537
Coefficient on X1Y4     0
Coefficient on X0Y5    -0.0098850348
Coefficient on X6Y0     0.0249931072
Coefficient on X5Y1     0
Coefficient on X4Y2     0.096111454
Coefficient on X3Y3     0

Coefficient on X2Y4     0.088510983
Coefficient on X1Y5     0
Coefficient on X0Y6    -0.0052361005
Coefficient on X7Y0     0
Coefficient on X6Y1     0.0012640293
Coefficient on X5Y2     0
Coefficient on X4Y3     0.0045515693
Coefficient on X3Y4     0
Coefficient on X2Y5    -0.015602358
Coefficient on X1Y6     0
Coefficient on X0Y7     0.015267121
Coefficient on X8Y0     0
Coefficient on X7Y1    -0.0029108563
Coefficient on X6Y2     0
Coefficient on X5Y3    -0.014419667
Coefficient on X4Y4     0
Coefficient on X3Y5    -0.029071818
Coefficient on X2Y6     0
Coefficient on X1Y7    -0.086778998
Coefficient on X0Y8     0
Coefficient on X9Y0     0.0093466917
Coefficient on X8Y1     0
Coefficient on X7Y2    -0.0012130598
Coefficient on X6Y3     0
                       -0.0008547469

*FIG. 11*

SCANNING MICROSCOPE WITH ENHANCED FOV AND NA

CROSS REFERENCE TO RELATED APPLICATIONS

This application claims the benefit of U.S. Provisional Application Ser. No. 62/953,671, entitled "SCANNING MICROSCOPE WITH ENHANCED FOV AND NA" in the name of David Kessler, filed 26 Dec. 2019 and incorporated herein in its entirety.

FIELD OF THE INVENTION

The present application is directed to optical microscopy and in particular to a highly symmetrical laser scanning microscope with toroidal reflective scan lens optics and concentric curved reflective collection optics.

BACKGROUND OF THE INVENTION

There is a need in laser scanning microscopy for higher resolution, larger field size, and reduced dispersive pulse broadening. This is attested to in a number of articles including:
Fan, Jingtao., Suo, Jinli, et al. "Video-rate imaging of biological dynamics at centimetre scale and micrometre resolution", *Nature Photonics* 13, 809-816 (2019).
Jonathan Bumstead, "Designing a large field-of-view two photon microscope using optical invariant analysis" *Neurophotonics*, April-June 2018 Vol. 5(2), pp. 025001-1 to -20;
Fabian F Voigt et. al., "A modular two-photon microscope for simultaneous imaging of distant cortical areas in vivo", *Multiphoton Microscopy in the Biomedical Sciences XV*, edited by Ammasi Periasamy, *Proc. of SPIE* Vol. 9329, 93292C-1 to -7. © 2015 SPIE;
Philbert S. Tsai, et. al., "Ultra-large field-of-view two-photon microscopy" *OPTICS EXPRESS* 13833 1 Jun. 2015|Vol. 23, No. 11; pp. 13833-13847. Vincent Hahn, Frederik Mayer et. al., "3D Laser Nanoprinting", *Optics and Photonics News*, October 2019, pp 28-35.
Sinefeld D. et al. "Nonlinear Adaptive Optics: Aberration Correction in Three Photon Fluorescence Microscopy for Brain Imaging." *Proc. of SPIE Vol.* 10073, 1007314-1 to -7.

There is a need for an efficient and low noise collection system for Two Photon Microscopy (TPM). Usually, microscope objectives have 0.5 NA or more over fields of a 1 or 2 mm. Apparatus described herein provides for large fields, such as fields of 30 mm or more, keeping the NA at 0.5 or higher.

One application for such a system could be for TPM applications used to scan, in vivo, large surface areas of the mouse brain, for example. Another application can be for fluorescence microscopy that employs excitation at short wavelengths and signal collection at longer wavelengths.

Another application of microscope optics could be in the area of nano- or micro-3D printing using one photon or two photon absorption, as described by Vincent Hahn, Frederik Mayer et. al in "3D Laser Nanoprinting" *Optics and Photonics News*, October 2019, pp 28-36.

SUMMARY OF THE INVENTION

An object of the present disclosure is to address the need for a scanning microscope having enhanced field of view (FOV) and numerical aperture (NA) and reduced pulse broadening due to dispersion.

The present disclosure describes an innovative highly symmetrical laser scanning microscope using a toroidal reflective scan lens (termed "Pumpkin configuration") which can optionally be combined with a highly efficient and low noise collection system, with minimal pulse broadening, based on a modified Offner configuration. The optics provide for a perfect scanning spot along an arcuate line. The perpendicular scanning dimension to the scan line is obtained by linearly translating the microscope apparatus with respect to the specimen, or by moving the specimen. Embodiments of the present disclosure can be of particular value for two-photon microscopy (TPM) and similar imaging approaches.

According to an embodiment of the present disclosure, there is provided an optical apparatus for imaging a sample comprising:
a) a scanning apparatus having a laser energizable to direct an input beam of a first wavelength to a reflective scanner that is rotatable about an axis;
b) a toroidal mirror surface that is symmetric about said axis and is disposed to direct scanned laser light of the first wavelength toward the sample in an arcuate scan pattern;
c) a compensator in the path of the input beam and formed to correct one or more aberrations of the toroidal mirror surface; and
d) collector optics that define a collection path that conveys, to a detector, scanned light of a second wavelength that is excited from the scanned sample.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 8A and 8B give exemplary design parameters for the system shown in FIG. 4.

FIG. 9 lists design data for the reflective toroidal objective listed in FIGS. 8A, 8B.

FIG. 10 lists surface coefficients for two of the compensator surfaces: the toroidal surface 3 and the aspheric surface 5 (of FIG. 8A).

FIG. 11. lists design details for the free-form coefficients of the refractive surface 6 listed in FIG. 8A.

DETAILED DESCRIPTION OF THE INVENTION

Figure 1:
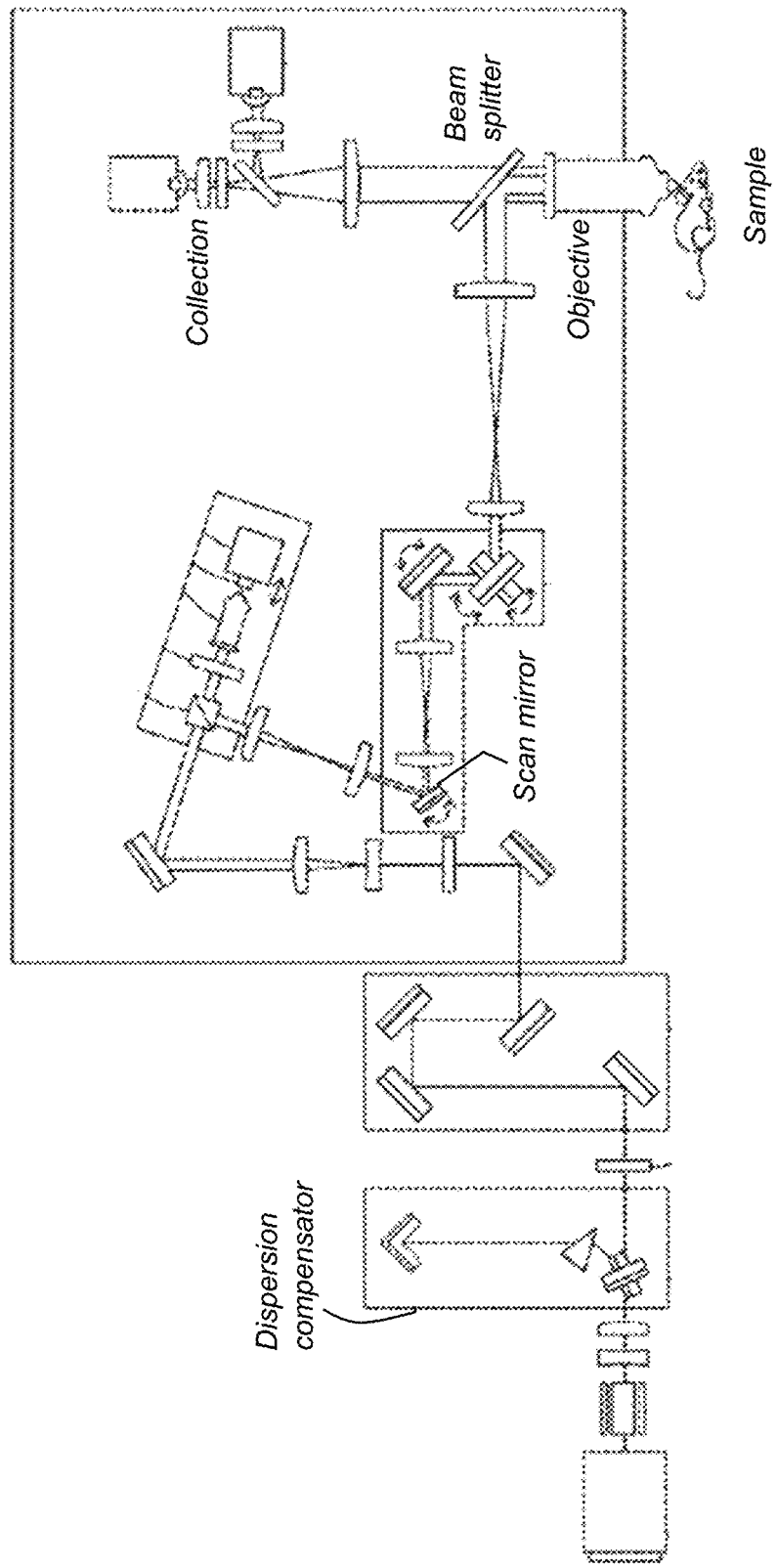
FIG. 1 is a schematic diagram showing a conventional laser scanning microscope having a refractive objective with limited by FOV and/or NA.

The following is a detailed description of the preferred embodiments, reference being made to the drawings in which the same reference numerals identify the same elements of structure in each of the several figures.

In the drawings and text that follow, like components are designated with like reference numerals, and similar descriptions concerning components and arrangement or interaction of components already described are omitted. Where they are used, the terms "first", "second", and so on, do not necessarily denote any ordinal or priority relation, but are simply used to more clearly distinguish one element from another.

In the context of the present disclosure, the term "energizable" describes a component or device that is enabled to perform a function upon receiving power and, optionally, upon also receiving an enabling signal.

In the context of the present disclosure, positional terms such as "top" and "bottom", "upward" and "downward", and similar expressions are used descriptively, to differentiate different surfaces or views of an assembly or structure and do not describe any necessary orientation of the assembly in an optical apparatus. The terms "upstream" and "downstream" as used herein have their conventional usage and refer to relative positions of light conveying or light conditioning components as the light proceeds along an optical path.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components. Substantially parallel planes are parallel to within +/−2 degrees. Likewise, substantially parallel beams are parallel to within about +/−2 degrees.

In the context of the present disclosure, the term "about", when used with reference to a measurement, means within expected tolerances for measurement error and inaccuracy that are accepted in practice. Some reasonable tolerance must be allowed, for example, for measurement differences in determining the extent of a particular viewer's visual field, as it would vary from the measurement of one practitioner to another.

The term "field of view" (FOV) in traditional microscopy relates to the field of view visible through the objective and the eyepiece. In laser scanning microscopy, FOV relates to the field (generally given in mm) that is acquired by the microscope optics and that may be processed and/or displayed. In the context of the present disclosure, the terms "field", "field of view", and FOV are used interchangeably.

The term Numerical Aperture (NA) in microscopy is given by:

$$NA = n * \sin(\alpha)$$

Where n is the refractive index of the immersed object and a is the semi-convergence angle at the image inside the immersed media. In the case of two-photon microscopy, used for brain research, for example, the medium is usually water and index n is about 1.33.

A "dichroic" coating has different reflection and transmission characteristics depending on the wavelength of incident light.

Conventional laser scanning microscope optics employ refractive objective lenses and are limited with respect to the product of FOV and NA. As just one exemplary system exhibiting these problems, the conventional solution shown in the schematic diagram of FIG. 1 shows laser scanning microscope optics (Svoboda et. US Patent Application Publication No. 20170123196A1) using a refractive objective. This system, considered to be a high FOV system in the art, has FOV of 5 mm with NA of 0.6. Off-axis aberrations of the refractive objective constrain the FOV. Another problem with this type of system relates to the very short pulses commonly used in applications such as Two Photon Microscopy (TPM). In TPM applications, the short pulses can be broadened by dispersion exhibited by the refractive optical elements that are within the objective, as well as elements on the input beam between the scan mirror and beam splitter. Broadening of the pulses reduces the signal obtained in the collection system. To reduce pulse broadening, a dispersion compensator can be used; however, this adds components and cost, increasing the overall bulk of the optical system.

A useful aspect of scanning optics for microscopy relates to the capability for focusing at different depths, without complications due to magnification change. To provide this capability, it is particularly beneficial to employ telecentric scanning. Telecentric scanning is characterized by a flat image plane and reduced spot size distortion with varying angle of the incident beam with respect to the optical axis. This helps to provide image content with good resolution and low distortion over the full scanned sample.

Telecentric Scanning Optics

The Applicant's technique for laser scanning takes an alternate approach using reflective optics for the scanner objective. The simplified schematic of FIG. 2. shows a basic symmetrical arrangement of optics that generate an arcuate image scan line. The reflective objective in this example shows a low NA configuration with a large FOV using a spherical mirror.

Figure 2:
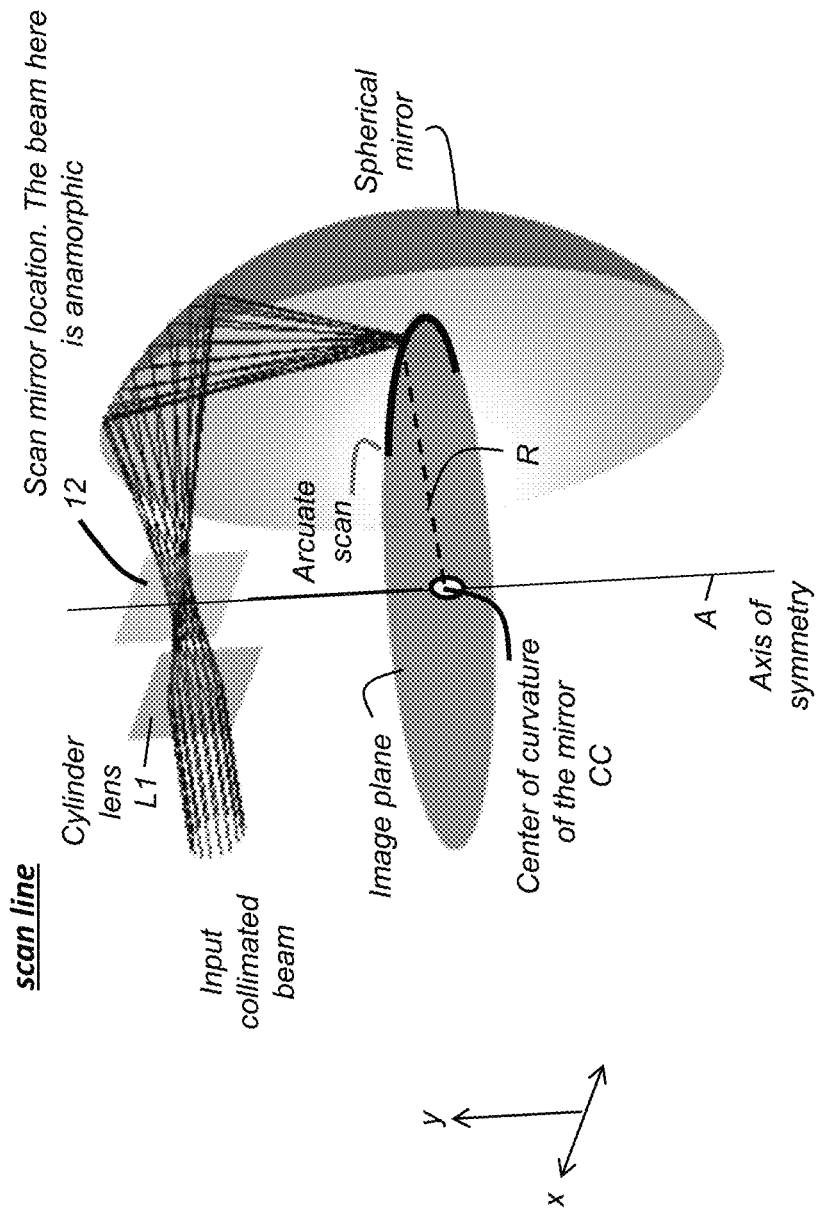
FIG. 2 is a perspective schematic diagram that shows a basic symmetrical arrangement of reflective optics for imaging an arcuate image scan line along an image plane.

In the optical scanning system of FIG. 2, a collimated input beam is focused in the vertical direction (the Y direction or cross scan direction) by a cylindrical lens L1, as shown. A scan mirror 12, or other suitable type of scanning surface, is disposed to rotate about an axis of symmetry A that extends through the center of curvature (CC) of the spherical mirror with radius R. This arrangement is free from astigmatism, so that the collimated input beam is focused onto the image plane.

The scan mirror 12 is disposed at a distance of 0.707R above the center of curvature CC, in the y-axis direction in the FIG. 2 embodiment shown.

When the beam is scanned by the scan mirror about the axis of symmetry as shown in FIG. 2, the focused spot sizes are unchanged. Significantly, due to symmetry, this system has no off-axis or field aberrations with this arrangement. The optical path distance at any scan mirror 12 angle is the same. The focused scanned beam traces an arcuate scan line at the image plane.

Other aberrations can be present and may increase with the increase in the input beam size and the resulting higher NA of the focused beam at the image. These aberrations, however, do not change as the beam is scanned, and can thus be preconditioned using a compensator, described subsequently, placed at the input beam.

Figure 3:
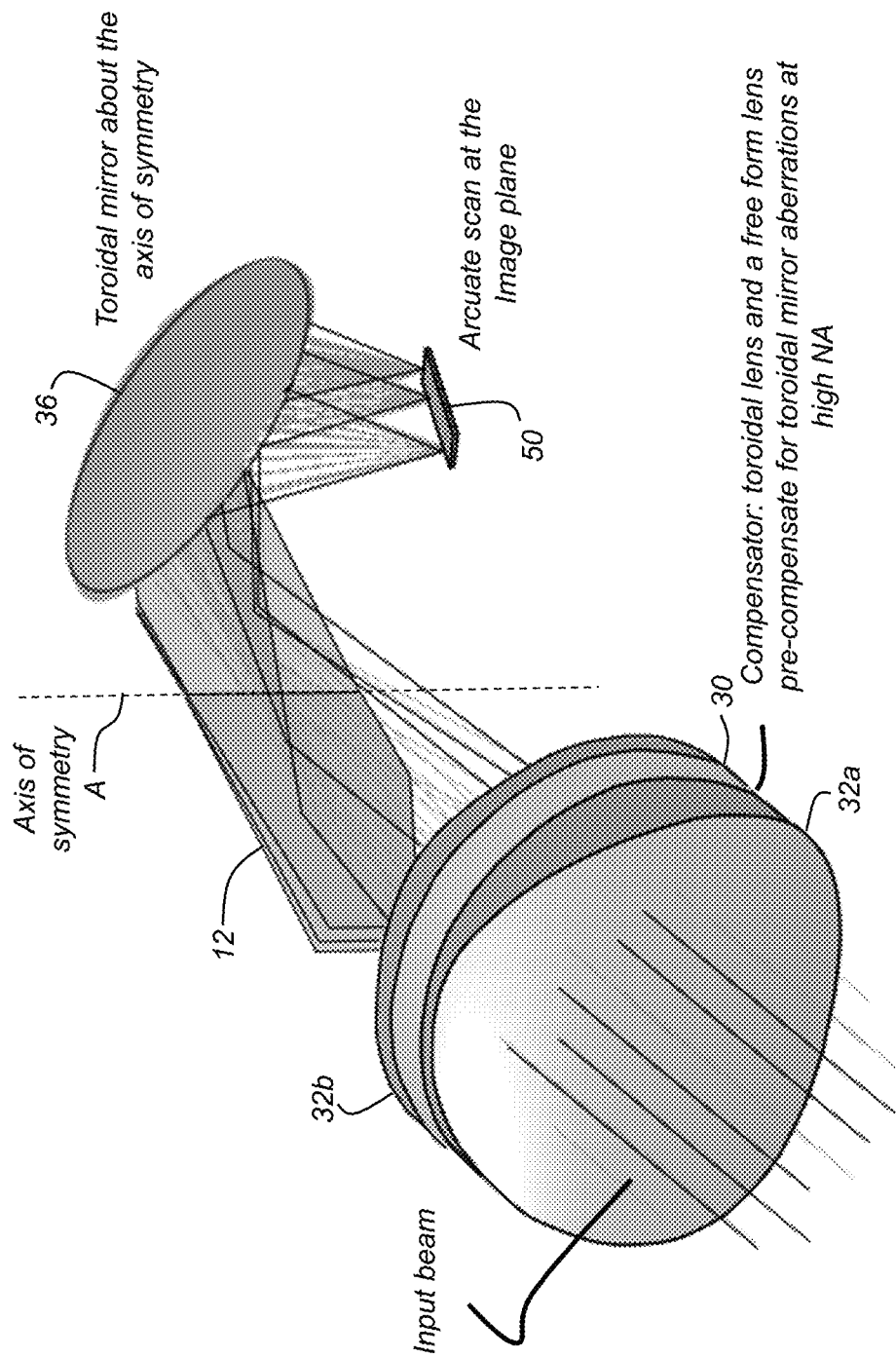
FIG. 3 shows a perspective view wherein the spherical mirror of the FIG. 2 arrangement is replaced by a toroidal mirror and a refractive compensator is disposed along the input beam.

FIG. 3 shows a perspective view of an embodiment of the present disclosure wherein the spherical mirror of FIG. 2 is replaced by a toroidal mirror and a compensator 30 is added for pre-conditioning the input illumination beam.

The scan mirror 12 is shown at three scan angles about the axis of symmetry A. Scan mirror 12 can be a galvo mirror or FSM (Fast Scan Mirror), polygon, or monogon device (such as a rotating single-facet polygon).

The input beam is directed toward scan mirror 12 from below left in the FIG. 3 embodiment. Compensator 30, placed in the path of the input beam, enables an NA of 0.5 or more at the image for any scan angle. The on-axis compensator 30 fully compensates for on-axis aberrations of the toroidal objective. Since the system is symmetric about the axis of symmetry as shown, compensation is applied to every field point along the scan line at image plane 50. With this relationship, the telecentric scanning system has no off-axis aberrations.

Except for packaging constraints, the system design imposes no limit to the arcuate scan line length. The beam incident on scan mirror 12 can be highly anamorphic, similar to the beam shown in FIG. 2, wherein the beam is considerably smaller in the cross-scan direction than along the scan direction.

Unlike the spherical arrangement of FIG. 2, the objective mirror 36 in FIG. 3 is toroidal about the axis of symmetry. One particularly advantageous toroidal shape, in terms of ease of machining and testing, is a segment of an even aspheric surface having its optical axis along the axis of symmetry. The toroidal surface cooperates with the scanning mirror 12 to provide a telecentric scan path for light, directing light to the sample in an arcuate scan pattern.

Input beam compensator 30 shown in the FIG. 3 embodiment consists of two refractive elements 32a, 32b. First refractive element 32a has a cylindrical or toroidal surface and an even aspheric surface. Second refractive element is 32b is a free-form lens. The two elements can be combined into a single free-form element. The reflective objective, employing a toroidal mirror 36, does not introduce dispersive pulse broadening. The remaining dispersive pulse broadening in this system is solely due to the compensator 30 elements. This broadening is equivalent for all field points, simplifying compensation when compared to the variable dispersion that can be induced in conventional refractive objectives.

An advantage of the reflective objective of the present disclosure is that it allows the system to work equally well with lasers of different wavelengths.

Figure 4:
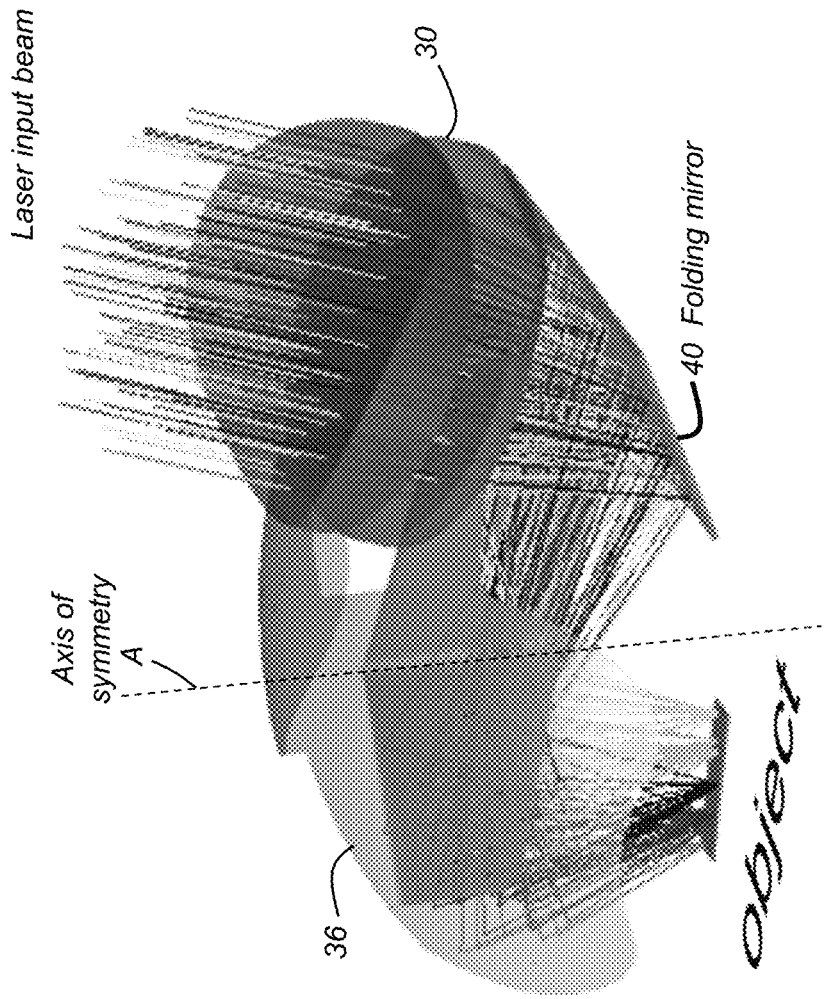
FIG. 4 is a schematic diagram that shows modification of the FIG. 3 configuration with the addition of a folding mirror

The FIG. 3 configuration can be modified with a folding mirror 40 as shown in FIG. 4, allowing improved clearance of the input beam at a distance from the biological specimen or sample at the object position. The aperture of toroidal objective mirror 36 is shaped to allow placement of compensator 30.

Figure 5:
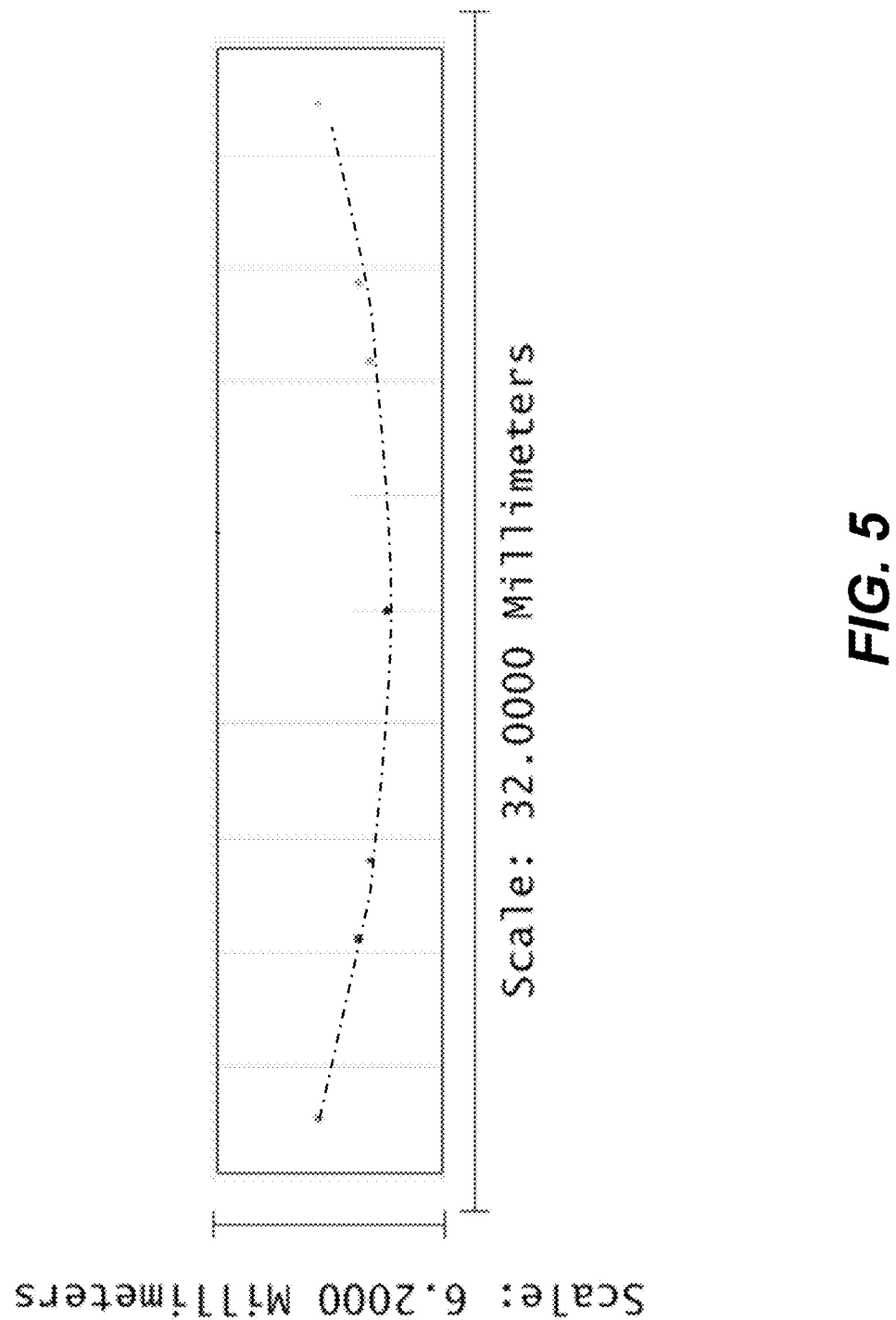
FIG. 5 is a schematic diagram that shows the arcuate scan line formed at the sample, centered about the system axis of symmetry.

FIG. 5 shows exemplary points along the arcuate scan line formed at the sample, centered about the system axis of symmetry A (FIG. 4).

Figure 6:
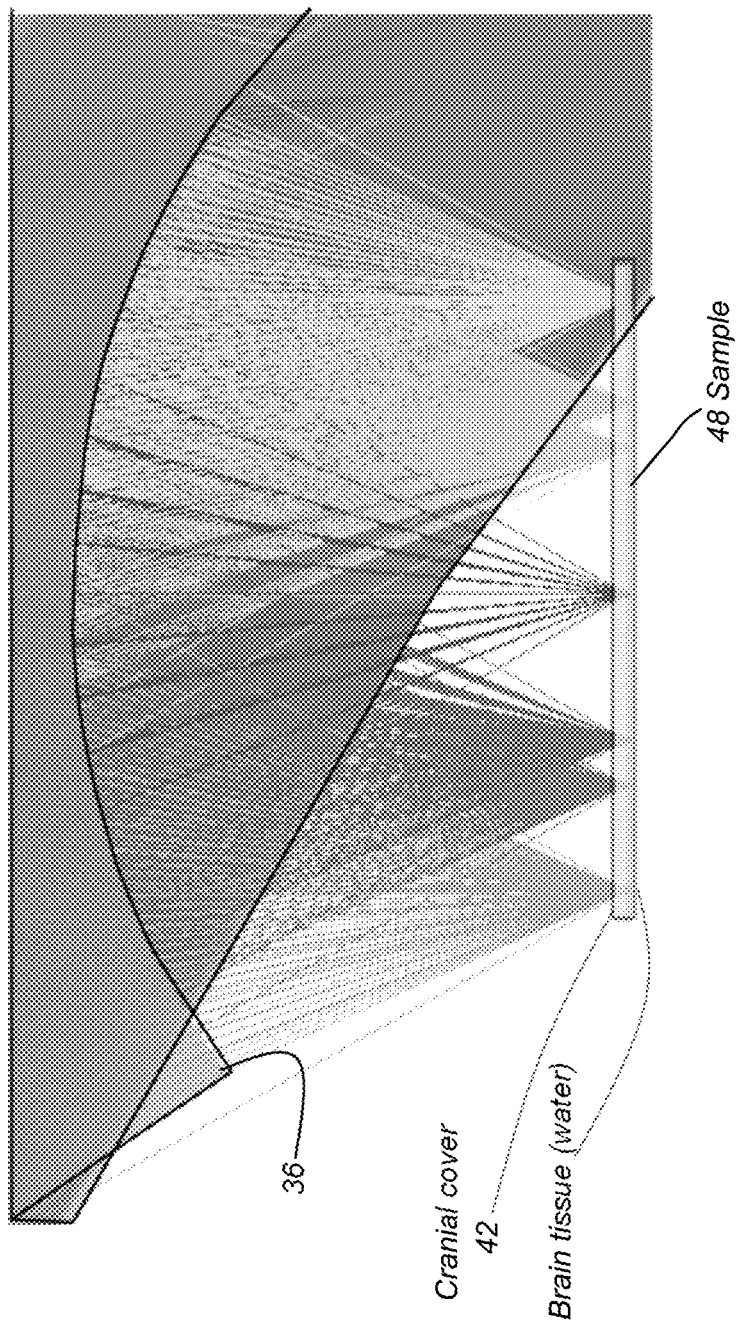
FIG. 6 shows a side view of the reflective objective with the beam focused through a cover plate.

For many types of laboratory imaging, it is standard practice to use a cover glass positioned against the sample 48 or specimen. When the scanned object is the brain of a mouse, this cover glass is considered a cranial cover plate. The close-up view of FIG. 6 shows a side view of the reflective toroidal objective with the beam focused on sample 48 through a cover glass 42. The scanned beam is focused through a cranial cover glass as shown, such as a glass plate of 0.5 mm thickness, then into the brain tissue.

Note that the scanning beam is telecentric. With this property, the chief rays are perpendicular to the scanned sample at each point along the scan. In addition, the working distance is sizable compared with conventional standard objectives.

Figure 7:
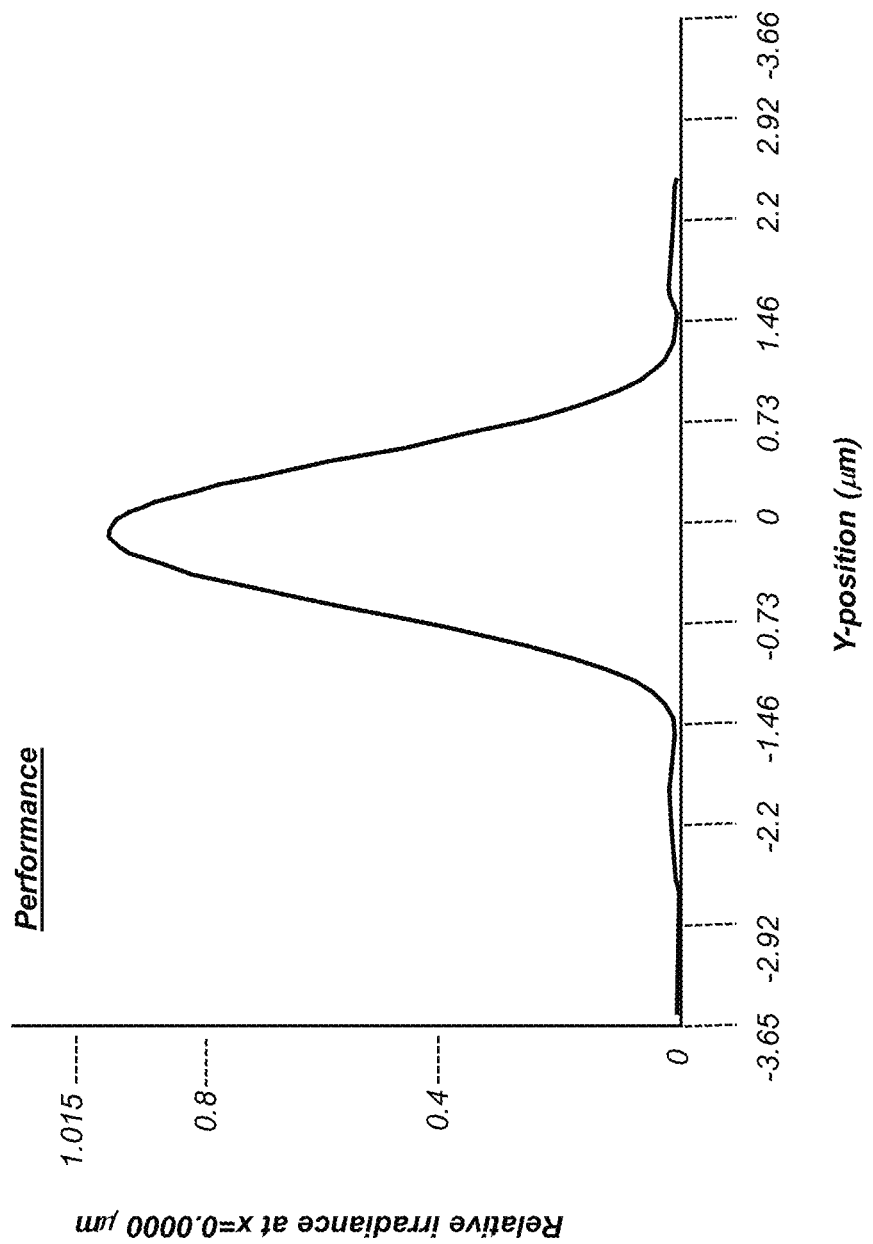
FIG. 7 is a graph that shows optical performance using the Huygens cross section of the point spread function for any of the field points for the optical system at 900 nm using a toroidal mirror scanner.

Optical performance of the scanning system is diffraction-limited over the whole field of view (FOV). FIG. 7 shows the cross section of the Huygens point spread function for the optical system at 900 nm using a toroidal mirror objective. The Strehl ratio is very high, at 0.965. System NA is 0.5 with a field size of 30 mm (that is, the width of the arcuate scan line in this example).

A design example for the system shown in FIG. 4 is given on tables in FIGS. 8A and 8B. In the example of FIG. 4, the toroidal reflective objective is a Q-type even aspheric surface. Some exemplary aspheric coefficients are listed on the table in FIG. 9.

The compensator on the input beam in this example has three surfaces: surface 3, 5 and 6 (FIG. 8A table). Surface 3 is cylindrical. Surface 5 (STO) is a Q-type even aspheric surface. The aspheric coefficients of surfaces 3 and 5 are shown in the tables of FIG. 10. Surface 6 is an xy free-form polynomial. Its coefficients are shown in the table in FIG. 11. This is a polynomial surface with no odd x terms due to the symmetry in the x direction, namely along the scan direction.

The compensator 30 shown in the preceding embodiments is static. This component can alternately include a dynamic element, such as an Adaptive Optic (AO) element, which would allow enhanced depth exploration. Without compensation, when image depth changes, spherical aberration is introduced. In addition, non-uniformities in the scanned tissues through which the beams propagate can introduce wavefront deformation. AO elements can further be used to dynamically compensate for these aberrations.

Figure 12:
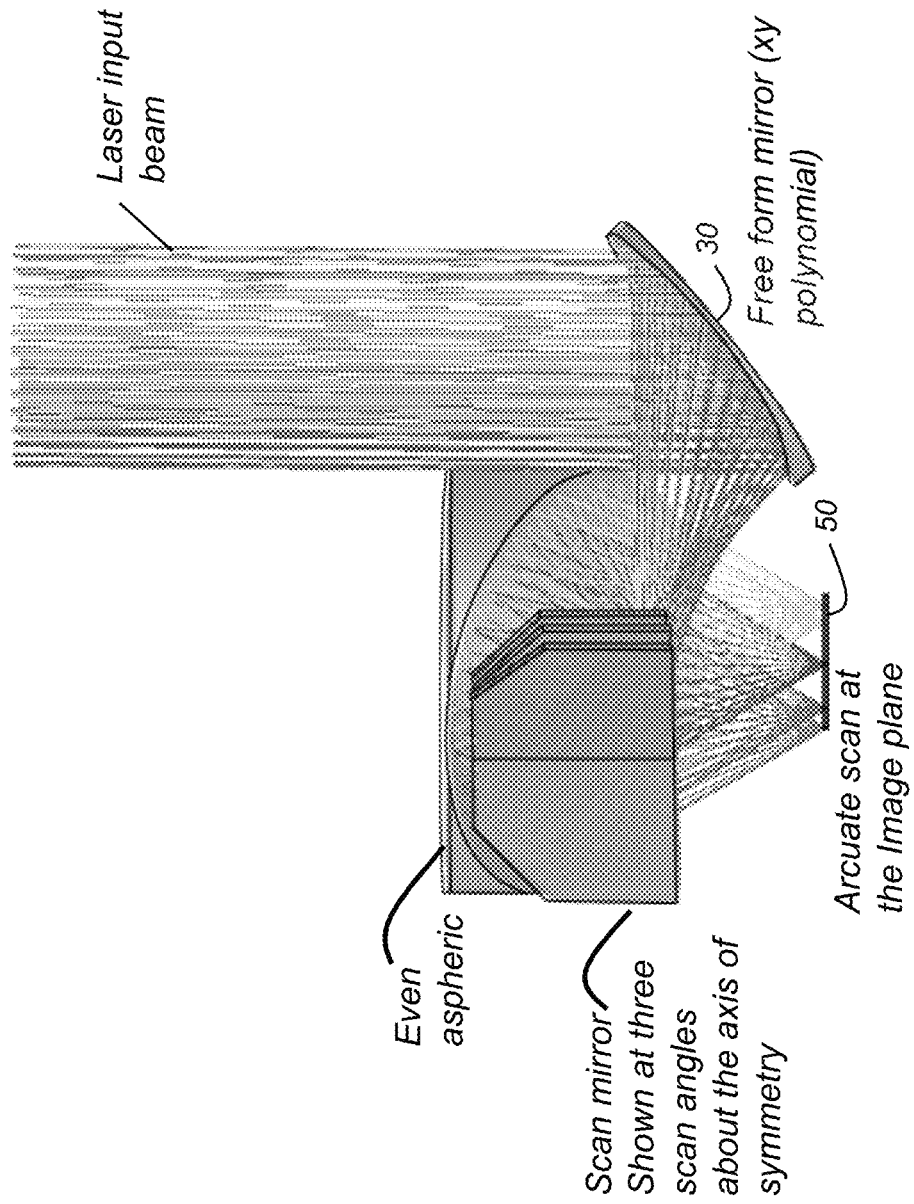
FIG. 12 is a perspective schematic showing a scanning microscope having both objective and compensator reflective.
Figure 13:
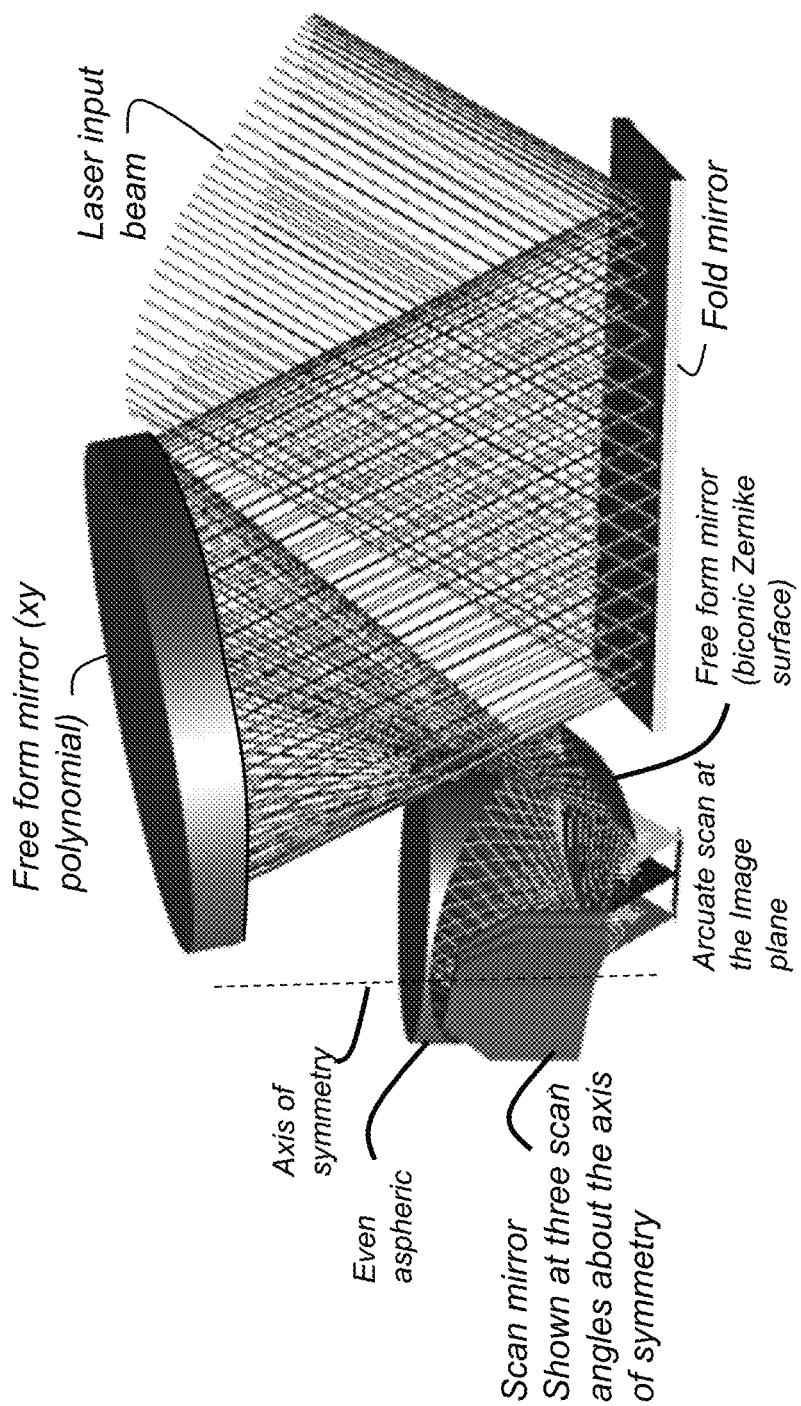
FIG. 13 is a perspective view showing the FIG. 12 system with an additional fold mirror on the input beam.

The schematic diagram of FIG. 12 shows another alternate embodiment of the present disclosure, in which the on-axis multi-surface refractive compensator 30 shown in FIG. 4 is replaced with a single reflective compensator 30, a free-form mirror. FIG. 13 is a perspective view of another embodiment using a reflective compensator 30, wherein a folding mirror is used to compensate the input beam.

In the alternate embodiment shown in FIGS. 12 and 13, input compensator 30 is a reflector. This arrangement is free of dispersion, with no pulse broadening, which is otherwise a particular problem in multiple photon microscopy. For example, TPM apparatus typically employs pulsed lasers such as a titanium sapphire laser that outputs pulses as short as 10 femtoseconds. Refractive optics tend to broaden the pulse widths; reflective optics, however, do not exhibit this tendency for pulse broadening.

Using the arrangement of FIGS. 12 and 13, a design sample was examined with changes of +/−100 microns in the water/tissue domain (not shown to scale). To maintain the Strehl Ratio at the sample tissue, the aspheric and toroidal components of the compensator were modified in similar manner as for use with an adaptive optics (AO) device. According to an embodiment, a reflective AO element provides part of compensator 30. The use of AO devices in scanning microscopy is described, for example, in the Sinefeld et al. reference cited earlier. Complete Strehl Ratio restoration can be achieved without the need to mechanically focus the optics.

Telecentric Collection Optics

Figure 14:
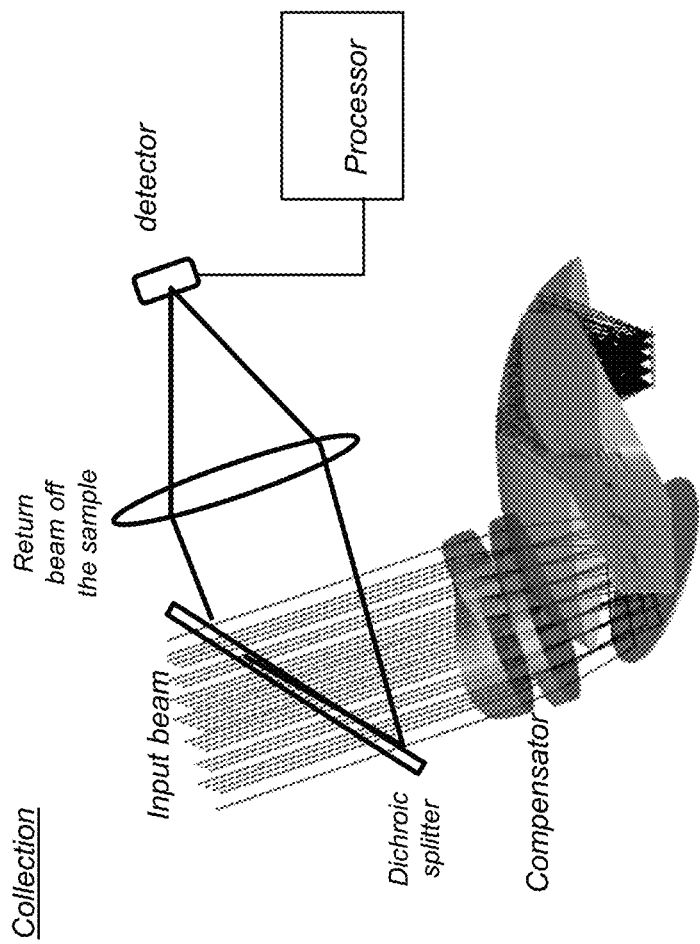
FIG. 14 is a perspective view showing a collection system with a dichroic splitter in front of the compensator to direct the light returning from the sample to an on-axis detector.

Most scanning microscopes collect the emitted light that is excited from the sample through the objective and direct it all the way to the input beam, where it is split with a dichroic splitter to a small detector such as a photo-multiplier tube PMT. Thus, for example, the embodiment shown in FIG. 3 can use a collection system with a dichroic splitter disposed in front of the compensator to direct the light returned from the sample into an on-axis detector for subsequent image processing by a control logic processor, as shown schematically in FIG. 14. With this conventional arrangement, however, the collected light is limited by the Numerical Aperture (NA) of the objective. As an improvement to this limitation for the conventional collection scheme, subsequent description and figures describe an improved alternate solution for collection wherein the collection NA is not limited by the objective NA.

Figure 15:
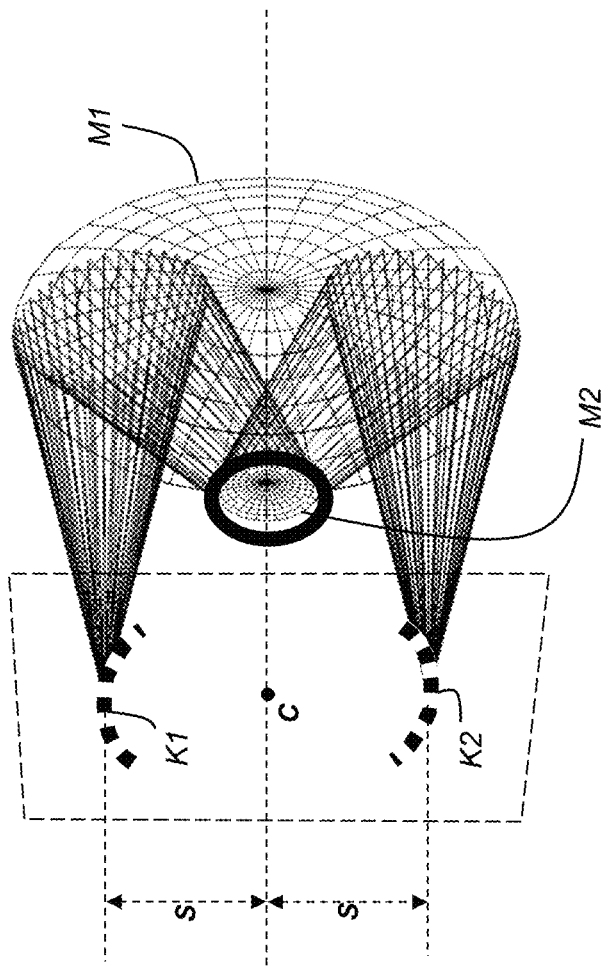
FIG. 15 shows a perspective view of a conventional Offner arrangement.

FIG. 15 shows a perspective view of a catoptric system following the Offner model, a known solution for high-energy photolithographic imaging, described in U.S. Pat. No. 3,748,015. The Offner imager is an afocal one-to-one object-to-image relay consisting of two concentric mirrors M1 and M2 that provide excellent performance for directing lithographic printing energy over an arc, as shown in FIG. 15.

Mirror M1 is termed the primary mirror; mirror M2 is considered as secondary mirror. Along the arc, all third order and fifth order aberrations are corrected. The width of the arc is limited mainly by $5^{th}$ order astigmatism. The two arcs K1 and K2 of this afocal optical system are optical conjugates; the light distribution along one arc is identical to the light distribution along the other. With this arrangement, the telecentric collector optics are afocal.

It can be appreciated that there are significant differences in scale, energy level, and performance requirements between precision scanning microscopy, as described herein, and high-energy lithographic etching applications that motivated the development of the Offner optical system of FIG. 15. In spite of these differences, however, the Applicant has found that some aspects of the optical principles used in an afocal Offner system can be successfully employed in scanning microscopy applications. In embodiments shown herein, the Applicant's solution employs some of the principles of the Offner configuration, adapted for a doubly telecentric collector system for a scanning microscope, wherein the collecting optical system is used to relay an arcuate image scan line onto an arcuate thin detector. The collector is telecentric with respect to both the optical image and object.

The original Offner system, as described in U.S. Pat. No. 3,748,015 and shown in FIG. 15 employs two concentric spherical mirrors, requiring precise spherical curvature, with precision alignment and distancing between mirrors. The Applicant has adapted some of the light-handling principles taught in Offner, but significantly improved the implementation used, relaxing some of the constraints while maintaining the essential aberration-free advantages enjoyed when using the Offner approach. The Applicant's solution includes the use of surface contours that can be modified to include aspheric terms.

Figure 16:
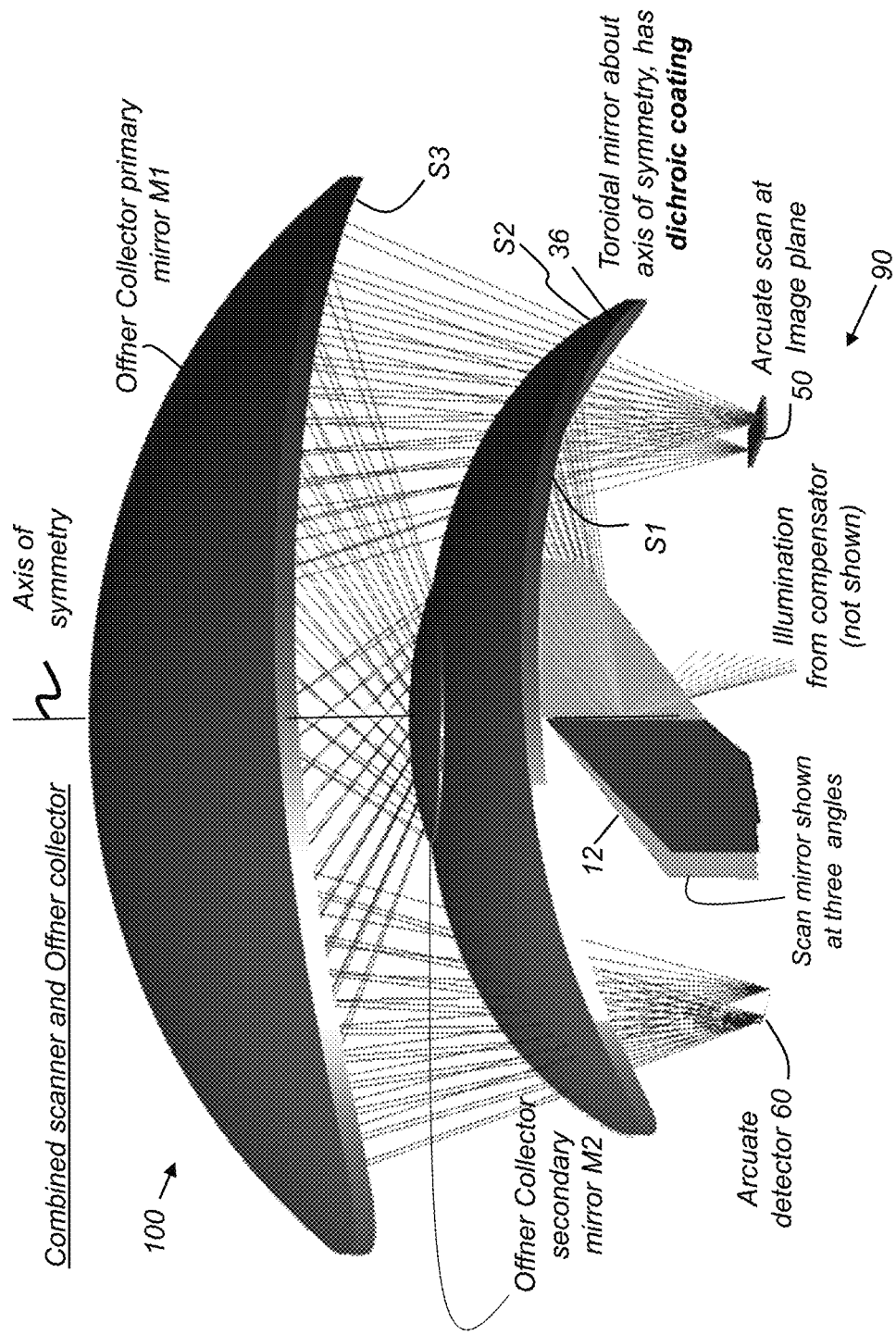
FIG. 16 is a perspective view that shows the combined scanner and collector.

FIG. 16 shows the combined scanner and collector optics for a scanning microscopy system using aspheres and other modifications of the Offner model, according to an embodiment. Supporting FIGS. 17A, 17B, and 17C provide explanatory schematics for enhanced understanding of the light handling provided by scanner optics 90 and telecentric collector optics 100 of the FIG. 16 arrangement.

Figure 17A:
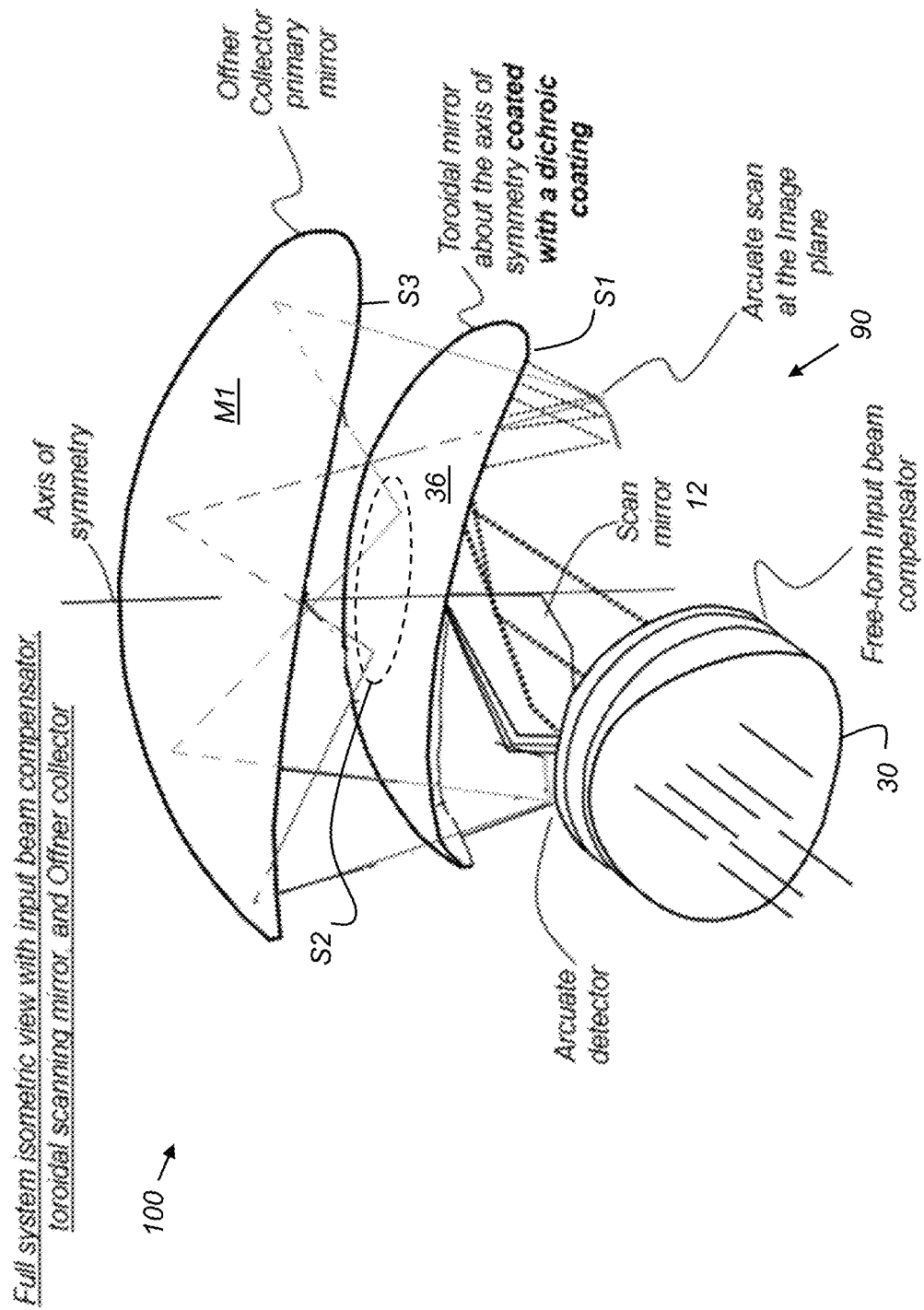
FIG. 17A is a perspective view of the combined scanner and collector, with the input beam refractive compensator.

FIG. 17A shows a perspective schematic view of the combined scanner optics 90 and collector optics 100, with a refractive input beam compensator 30. Paths of light within the collector are indicated. It can be noted that the same structure forming the toroidal mirror 36 provides surfaces conditioned for both scanning and collection functions. The concave surface S1 of mirror 36 that faces scan mirror 12 has a dichroic coating that selectively reflects or transmits light according to wavelength. The opposite convex surface S2 of mirror 36, facing a concave surface S3 of the Offner primary mirror M1, is the area treated to provide the secondary mirror for collector optics 100, corresponding to mirror M2 in FIG. 15, that is needed to emulate the catoptric Offner system.

Figure 17C:
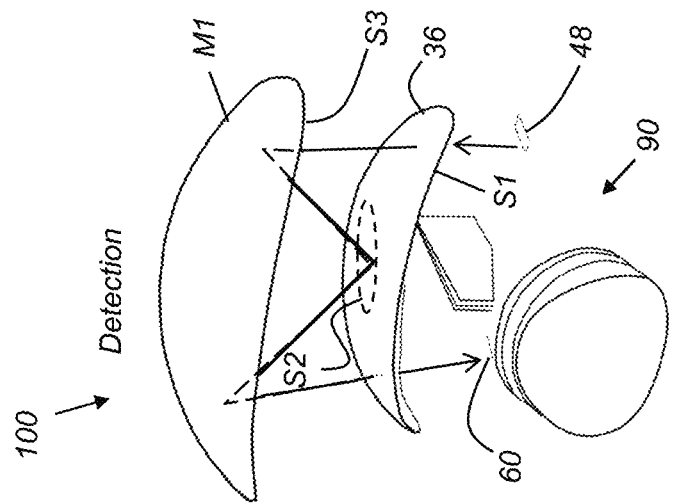
FIG. 17C shows the combined scanner and collector optics with the detection path indicated.
Figure 17B:
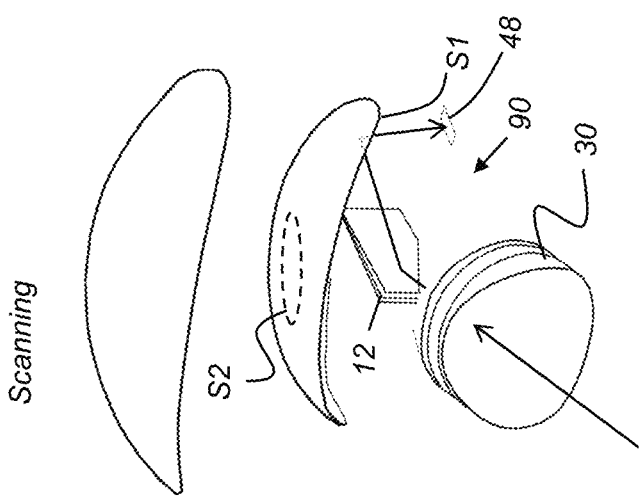
FIG. 17B shows the combined scanner and collector optics and traces the path of scanning light.

FIG. 17B shows, in simplified outline form, components of the combined scanner optics 90 and collector optics 100 and traces the path of scanning illumination from the input beam defined by scanner optics 90. Scanner optics 90 convey this scanning illumination along the scan path that leads through the compensator 30, to the scan mirror 12, to the reflective concave objective surface S1 of mirror 36, then from surface S1 onto sample 48. The scan path from the surface S1 to sample 48 is telecentric.

FIG. 17C shows the combined scanner and collector optics 90 and 100 with the collection or detection path that is defined by these optics. The collection path leads from sample 48 through the dichroic-corrected, concave objective surface S1 to primary reflective surface S3 of the Offner-like collecting system, then to the secondary of the collector as surface S2, which is preferably a treated area or region formed or disposed on top of a portion of the reflective objective 36, and then to the primary surface S3 for a second reflection, and then back through surface S1 and towards the detector 60.

In TPM imaging, the scanning beam is typically in the IR range, such as 900 nm, and the collected light excited from the sample is at half the wavelength (e.g. 450 nm for 900 nm scanning).

In the FIG. 16 embodiment, scan mirror 12 directs a pre-compensated input beam, typically in the IR for TPM as noted earlier, as scan illumination to the dichroic surface of toroidal mirror 36. This scanned beam is then reflected toward an image plane 50. The excited light from the sample, typically in the visible range for TPM, then passes through toroidal mirror 36 and is reflected from the surface of primary mirror M1.

For TPM imaging, surface S1 of toroidal mirror 36 has a dichroic coating configured to reflect the longer (e.g. IR) scanning wavelength and to transmit the shorter collected wavelength. The scanning beam is scanned along the arc at image plane 50. Three exemplary angular positions of scanning mirror 12 are represented. By virtue of the primary and secondary mirrors M1 and 36, respectively, of collector optics 100, an arcuate detector 60 is optically conjugate with the image plane 50. The collected wavelength is conveyed through the dichroic coating of toroidal mirror 36 a second time as it proceeds to detector 60. Unlike the Offner arrangement described with respect to FIG. 15, the FIG. 16 configuration for collector optics 100 utilizes aspheric surfaces for primary mirror M1 and secondary toroidal mirror 36.

Although not apparent from the angles of light represented in FIG. 16, the light at image plane 50 and detector 60 is telecentric at each instant, that is, at each angle of scan mirror 12. The doubly telecentric collector of combiner 100 is afocal.

Figure 18A:
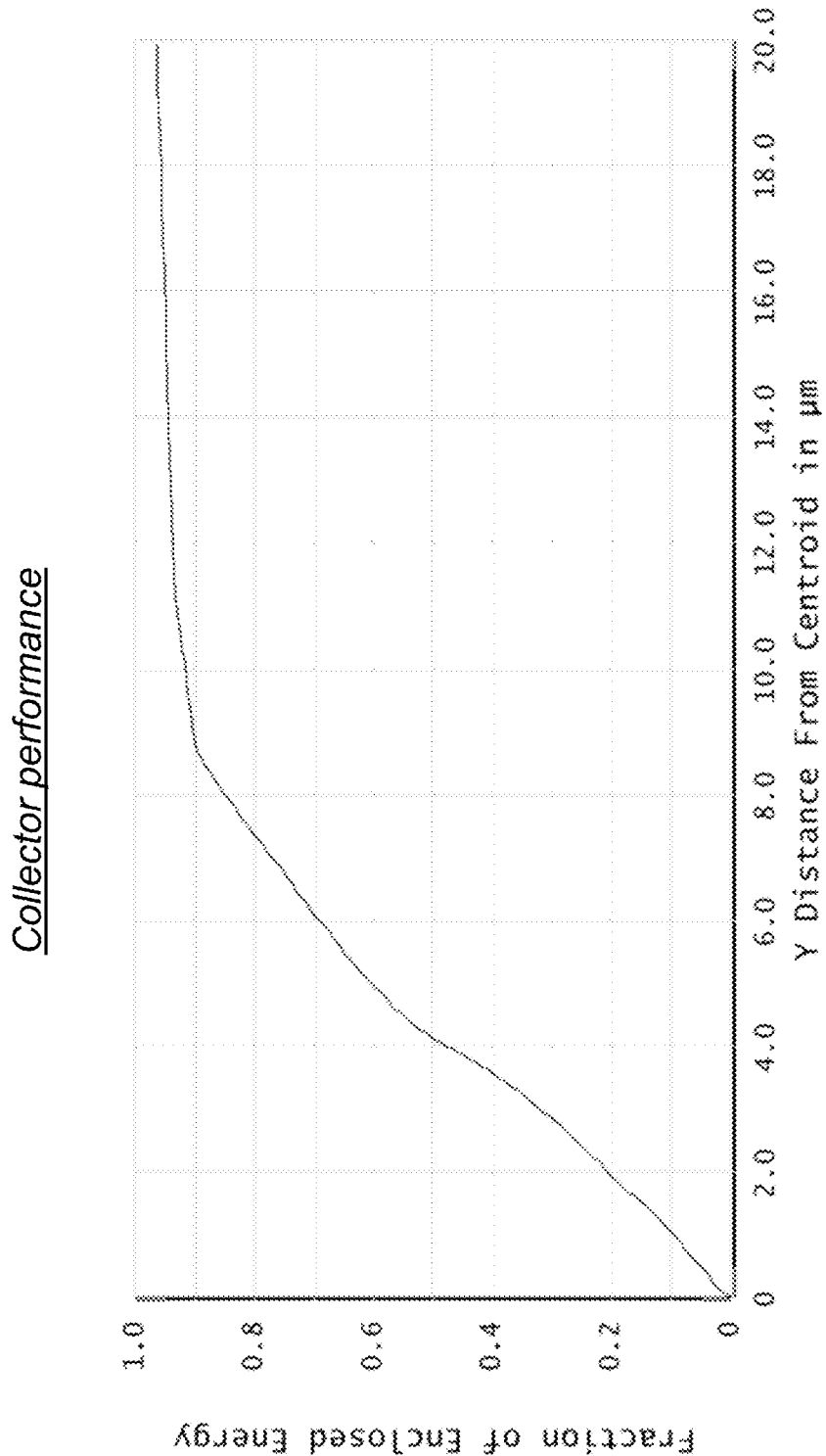
FIGS. 18A and 18B are graphs showing collector performance.
Figure 18B:
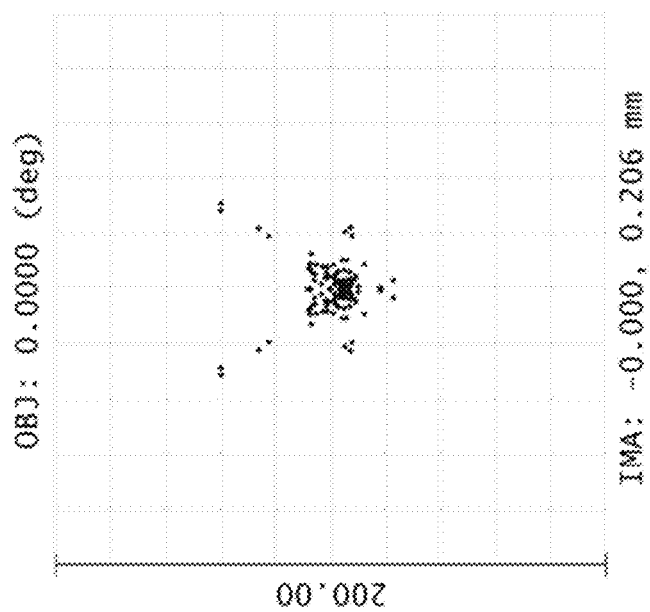

FIGS. 18A and 18B are graphs showing collector performance for an embodiment using the configuration of FIGS. 16-17C. An arcuate detector width of 20 microns in the cross-scan direction collects 90% of the spot energy for all field points.

Figure 19:
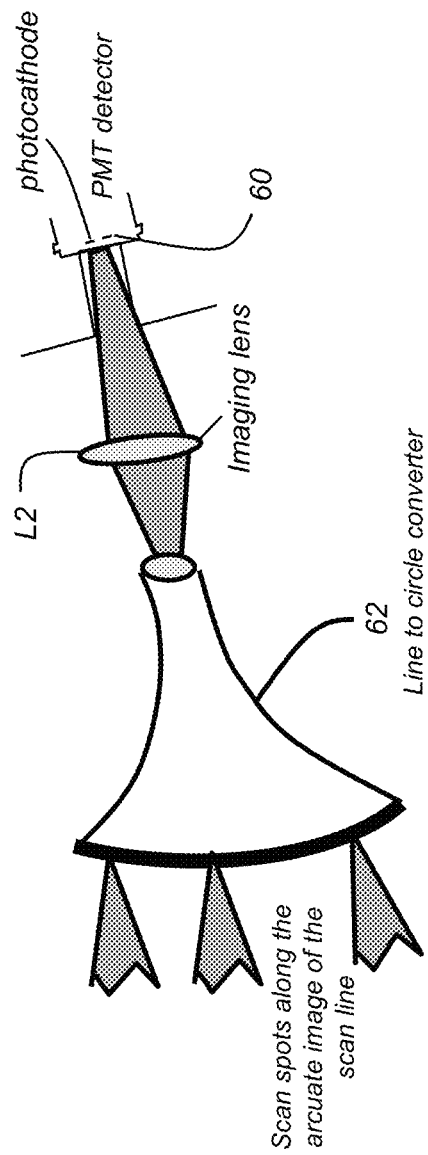
FIG. 19 is a schematic diagram that shows aspects of detector geometry.

FIG. 19 is a schematic diagram that shows aspects of detector 60 geometry. The detector 60 typically has a round surface. A typical PMT detector is the Hamamatsu H4722-50 which has a round photosensor of about 5 mm diameter. If the scan line length is, for example, 10 mm, and the arcuate slit is 50 microns wide, the total area of the slit is about 0.5 mm². The smaller the detector 60 area, the lower the detector noise. The arcuate slit image can be converted into a round output port of 0.8 mm diameter with NA of 0.5. This output port can be imaged onto the detector 60 using a singlet lens L2. As is familiar to one skilled in the optical arts, a line to circle converter 62, such as a fiber converter from Fiberoptic Technology, Inc. Pomfret, CT, can be employed to support the sensing function in a number of ways.

Figure 20:
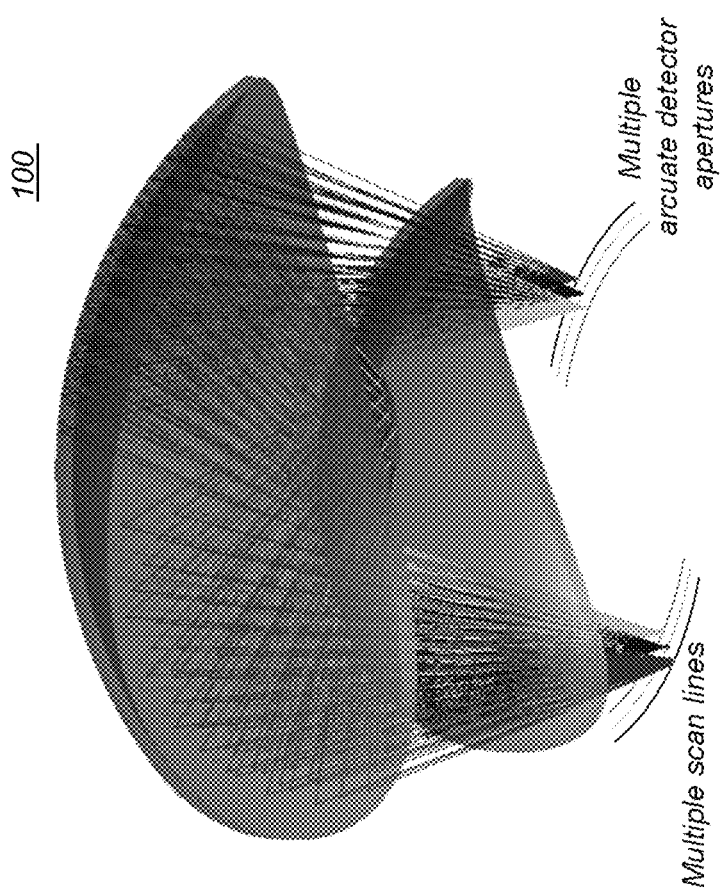
FIG. 20 is a perspective view that shows multiple beam scanning and collection.

As is shown in the schematic diagram of FIG. 20, the modified telecentric collector optics 100 is capable of simultaneously imaging multiple arcuate scan lines onto a corresponding set of multiple arcuate slit detectors. By way of example, FIG. 20 shows simultaneous scanning for 3 scan lines. The scan lines could use light of the same wavelength and polarization or employ light having different wavelengths or polarizations. This capability can be employed to help increase the frame rate for microscopy imaging.

Thus, for example, three beams from laser sources can be directed as input to the scan mirror and scanned simultaneously by the scanning optics, as described hereinabove. The beams, which can be substantially parallel, but input at slightly different angles such as to within 3 or 4 degrees of parallel, are separated as shown at the sample plane in FIG. 20. The catoptric collection system can then image the three scan lines onto the corresponding arcuate detectors.

The multiple beams can also track the same arcuate scan line, one after the other, or different arcuate image lines as shown, with one or more polarization states or multiple wavelengths. For each of the scan lines shown there would be a different input beam, not shown (not shown) approaching the scan mirror at a different cross scan angle.

According to an alternate embodiment, dithering can be used to help increase scanning throughput. A piezoelectric actuator, or other actuator, can be used to displace the scanning beam rapidly as scanning mirror 12 turns, effectively providing a scanned swath, increasing the number of scan lines that are traced over the sample during one sweep of the reflective scanning surface, such as the scanning mirror galvo.

With small area detector slits, the low noise feature of the collector is enabled for all scan lines.

Catadioptric Embodiment

The original Offner system of FIG. 15 is a catoptric system having two concentric spherical reflective surfaces in air. An alternative embodiment described herein and shown, for example, in FIGS. 21 and 22 provide collector optics that use glass between the primary and secondary reflective surfaces, thus forming a catadioptric system.

Figure 21:
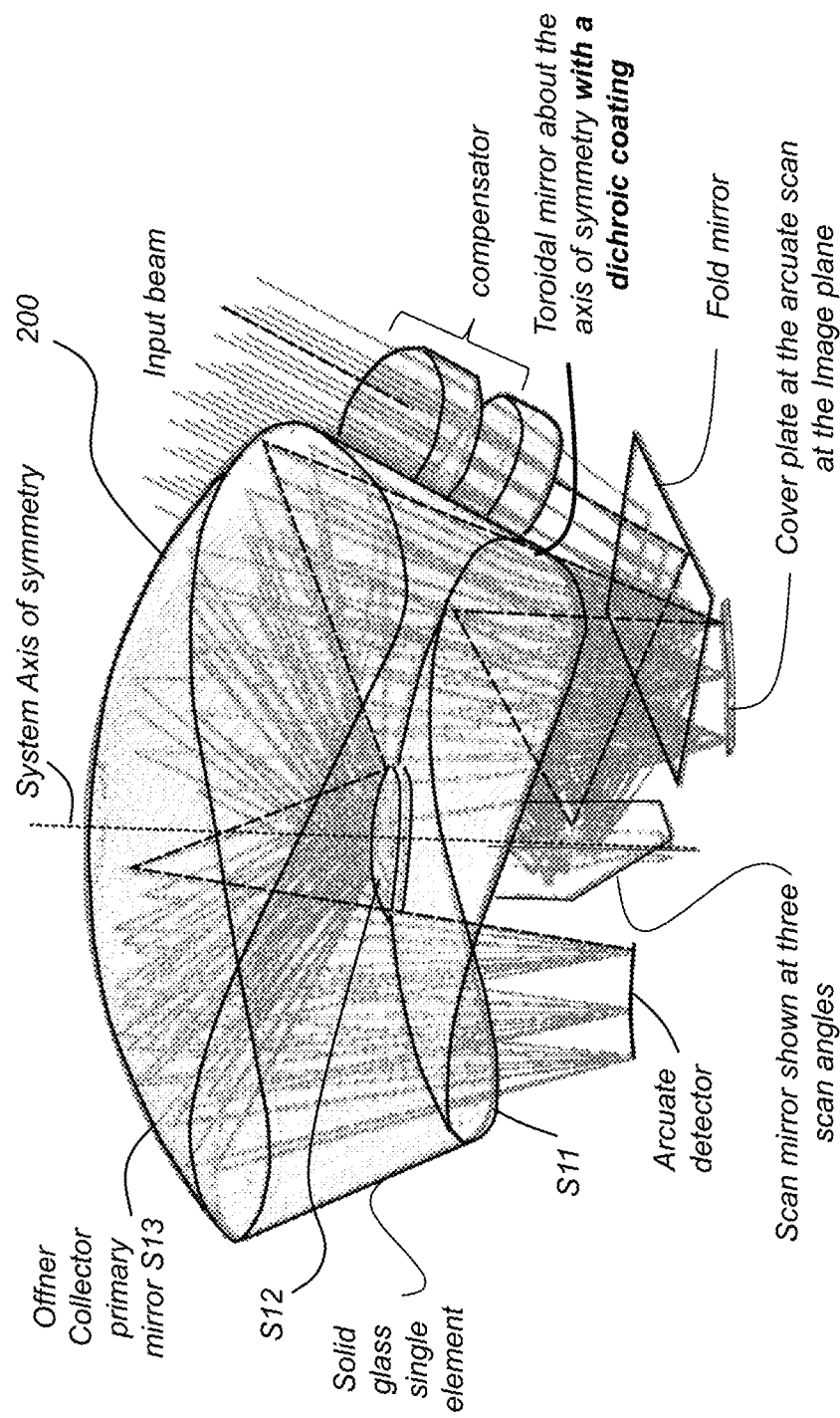
FIG. 21 is a perspective view that shows a catadioptric configuration that adapts Offner principles for collector functions and combines this approach with toroidal reflection scanning.
Figure 22:
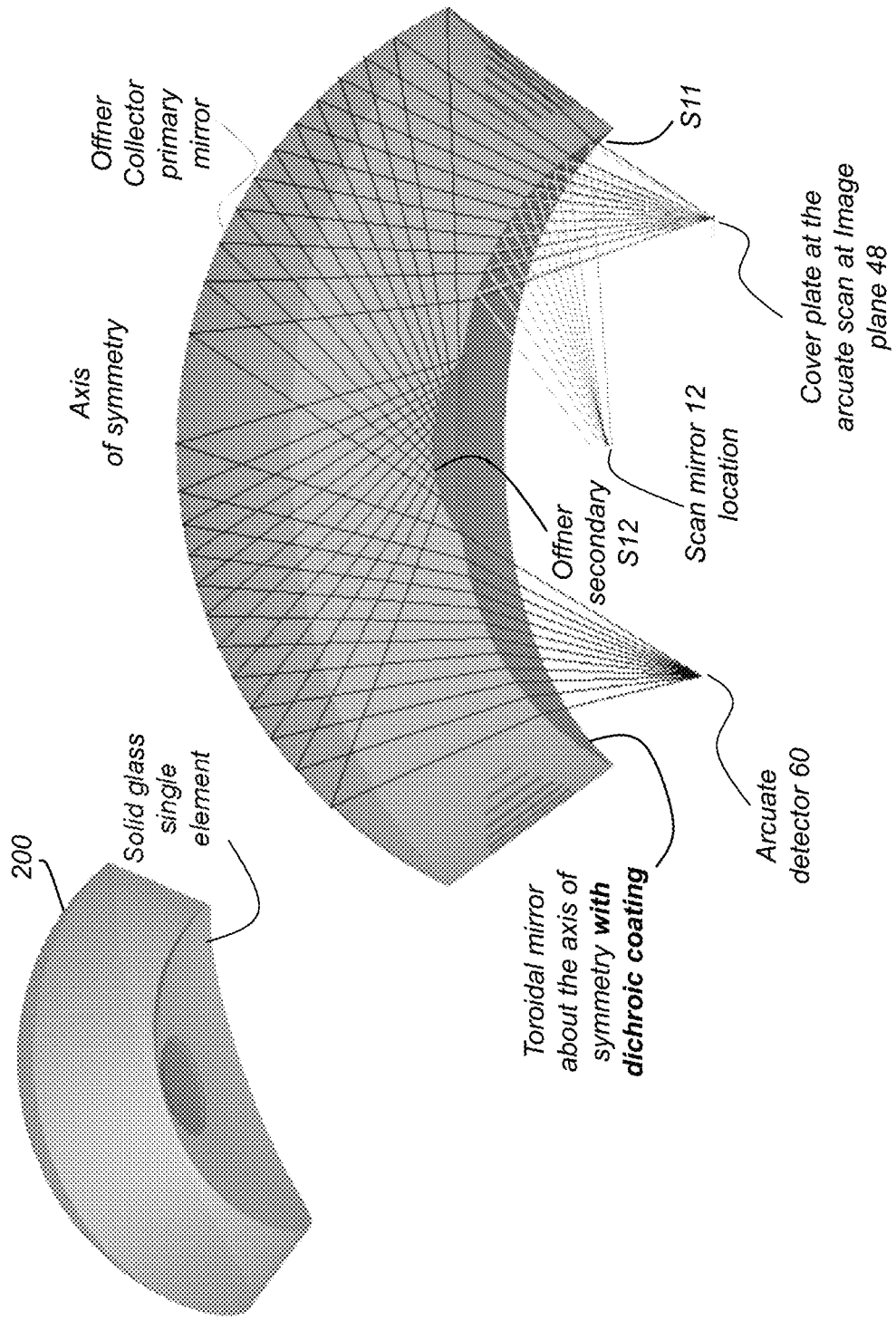
FIG. 22 shows a simplified cross-sectional view of the single-glass embodiment that includes both scanning and collection needed for two-photon imaging.

FIGS. 21 and 22 are perspective views that show a catadioptric configuration that adapts Offner principles for collector functions and combines this approach with refractive elements and toroidal reflection scanning. The FIG. 21 configuration combines the toroidal reflector and the Offner collector into a single component, shown as a collector 200. The combined scanning and collection optics can be formed on a piece of glass or other optical material.

Collector 200 is a glass element with different surface coatings on surfaces S11, S12, and S13. For scanning illumination, concave surface S11 corresponds to the dichroic surface S1 of FIG. 16. The upper portion of this glass element from the FIG. 21 view has a convex surface S13 that is reflective and serves as the primary reflector. In concert with the Offner model described hereinabove, an inner, central portion of the bottom surface (in the perspective view of FIG. 21), convex with respect to light reflected from upper surface S13, provides the secondary mirror as surface S12. Surface S12 can be formed on the same side of collector 200 that provides dichroic surface S11 or can be separately fabricated and adhered or otherwise coupled to the collector 200 surface. The enlarged portion of FIG. 22 shows a cross-section view of collector 200. The cross section runs through surface S12, showing how this surface is differentiated from the surrounding dichroically treated surface S11.

The surfaces of the glass element forming collector 200 can be even aspherics, that is, Q-Type aspherics, so as to minimize material removal during manufacturing. Among its advantages, the single element catadioptric embodiment eliminates the need to align primary and secondary reflective surfaces and to align the scan element with the collector elements.

In FIG. 22, only the meridional rays in the cross scan direction are shown for the on axis field point. It should be noted that the glass embodiment of FIGS. 21 and 22 also provides a telecentric collector.

Using Adaptive Optics (AO) for Variable Depth Scanning

Figure 23:
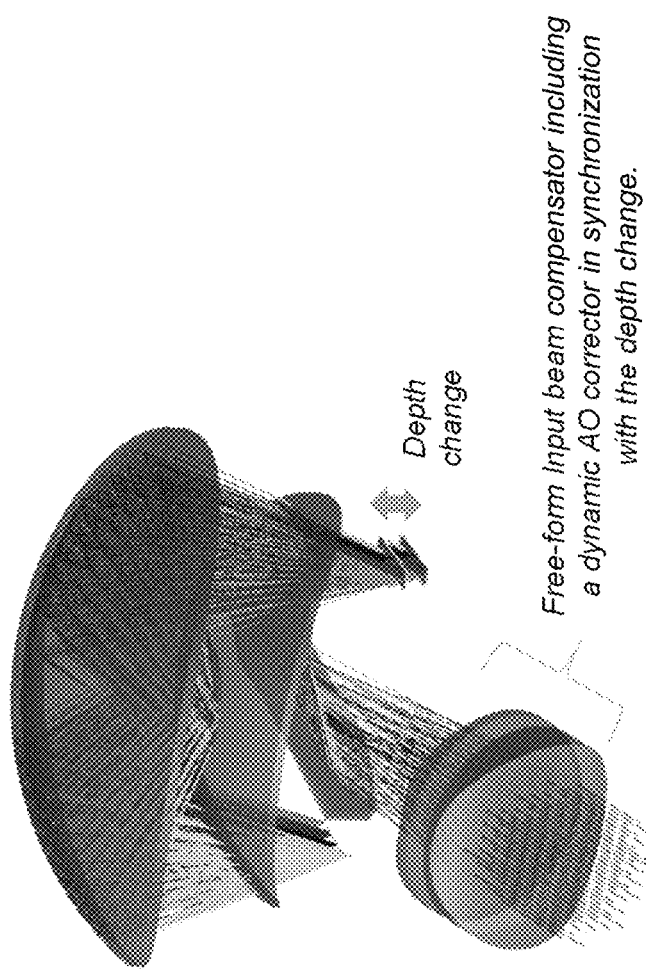
FIG. 23 shows an embodiment with adaptive optics (AO) for depth scanning. configuration.

FIG. 23 shows the catoptric embodiment of FIG. 16 with adaptive optics (AO) for depth scanning. A free-form input beam compensator includes a dynamic AO corrector in synchronization with the depth change.

FIGS. 20 to 23 for both catoptric and catadioptric scanner and collection combinations are shown with a refractive on-axis compensator. It is possible to replace the refractive compensator with a reflective compensator as was shown in FIGS. 12 and 13.

According to an embodiment of the present disclosure, a scanning microscope has a) a scan mirror rotatable about an axis to direct a scan beam; b) a toroidal reflector surface symmetric about the axis and disposed to reflect the scan beam toward an object along an arcuate scan path and to transmit light from the object; c) a primary mirror symmetric about the axis and disposed to collect light transmitted from the object and reflect the light from the object toward a detector; and d) a compensator in the path of the scan beam and formed to correct aberration of the toroidal reflector surface. The compensator can be a toroidal lens or a free-form lens. The toroidal reflector surface can have a dichroic coating. The reflected light to the detector can have an arcuate detector path symmetric to the arcuate scan path. The input beam compensator can include a dynamic AO corrector. According to another embodiment, a primary mirror is symmetric about the axis and disposed to collect light transmitted from the object and reflect the light from the object toward a detector. As is well known, but not specifically described for embodiments shown herein, the detector cooperates with processor logic and resources to store acquired image content and form an image from data obtained in successive scans.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An optical apparatus for imaging a sample comprising:
   a) a scanning apparatus having a laser energizable to direct an input beam of a first wavelength to a reflective scanner that is rotatable about an axis;
   b) a toroidal mirror surface that is symmetric about said axis and is disposed to direct telecentric scanned laser light of the first wavelength toward the sample in an arcuate scan pattern;
   c) a compensator in the path of the input beam and formed to correct one or more aberrations of the toroidal mirror surface; and
   d) collector optics that define a collection path that conveys, to a detector, scanned light of a second wavelength that is excited from the scanned sample.

2. The apparatus of claim 1 wherein the toroidal mirror surface is concave and has a dichroic coating that is configured to reflect the first wavelength toward the sample and to transmit a second wavelength emitted from the sample.

3. The apparatus of claim 1 wherein the collector optics are telecentric and further comprise:
   (i) a primary mirror surface that is symmetric about said axis and is disposed to reflect light of the second wavelength that is conveyed to the collection path through the toroidal mirror;
   (ii) a secondary mirror surface that is symmetric about said axis,
   wherein the primary and secondary mirror surfaces form an optical conjugate to the sample at a detector position;
and wherein the detector is disposed at the detector position and configured to generate a signal according to light excited from the arcuate scan pattern.

4. The apparatus of claim 3 wherein the collection path directs light of the second wavelength from the sample to the primary surface, then to the secondary surface, and then back again to the primary surface before arriving at the detector.

5. The apparatus of claim 1 wherein the compensator further comprises an adaptive optic configured to dynamically compensate for wavefront deformation.

6. The apparatus of claim 1 wherein the compensator is a free-form mirror.

7. The apparatus of claim 1 wherein the toroidal mirror surface has a shape corresponding to a segment of an even aspheric surface having its optical axis along the axis of symmetry.

8. The apparatus of claim 3 wherein a single glass element has the primary mirror surface formed on one side and provides the secondary mirror surface and the toroidal mirror surface on the opposite side.

9. The apparatus of claim 1 further comprising a line-to-circle converter disposed in the defined collection path of light to the detector.

10. The apparatus of claim 1 further comprising a second laser energizable to direct a second laser beam of a third wavelength through the compensator and to the reflective scanner.

11. The apparatus of claim 1 further comprising an actuator disposed to rapidly displace the input beam during reflective scanner rotation.

12. An optical apparatus for imaging a sample comprising:
   a) a scanning apparatus having a laser energizable to direct an input beam of a first wavelength to a reflective scanner that is rotatable about an axis;
   b) a toroidal mirror surface that has a dichroic coating and is symmetric about said axis,
   wherein the toroidal mirror surface, in cooperation with the scanning apparatus, defines a telecentric scan path between the dichroic surface and the sample;
   c) a compensator in the path of the input beam and formed to correct one or more aberrations of the toroidal mirror surface;
   d) telecentric collector optics comprising:
      (i) a primary mirror surface that is symmetric about said axis and is disposed to reflect light of the second wavelength that is conveyed to the collection path through the toroidal mirror;
      (ii) a secondary mirror surface that is symmetric about said axis,
      wherein the primary and secondary mirror surfaces form an optical conjugate to the sample at a detector position;
   and
   e) a detector disposed at the detector position and configured to generate a signal according to light excited from the arcuate scan pattern.

13. The apparatus of claim 12 wherein the compensator further comprises an adaptive optic configured to dynamically compensate for wavefront deformation.

14. The apparatus of claim 12 wherein the compensator is a free-form mirror.

15. The apparatus of claim 12 wherein the toroidal mirror surface has a shape corresponding to a segment of an even aspheric surface having its optical axis along the axis of symmetry.

16. The apparatus of claim 12 wherein a single glass element has the primary mirror surface formed on one side and provides the secondary mirror surface and the toroidal mirror surface on the opposite side.

17. The apparatus of claim 12 further comprising a line-to-circle converter disposed in the defined collection path of light to the detector.

18. The apparatus of claim 12 further comprising a second laser energizable to direct a second laser beam through the compensator and to the reflective scanner, wherein the second laser beam differs from the first laser beam by one or both wavelength and polarization state.

19. A method for imaging a sample comprising:
a) scanning a laser input beam of a first wavelength to the sample by energizing a reflective scanner to rotate about an axis and by directing the scanning beam to the sample over an arcuate, telecentric scanning path defined by the reflective scanner and by a toroidal mirror surface that is symmetric about said axis,
wherein the laser input beam is preconditioned by a compensator formed to correct one or more aberrations of the toroidal mirror surface;
b) collecting light excited from the sample by the scanning beam and directing the collected light to a detector over a telecentric collection path formed using reflection from a primary mirror symmetric about the axis and from a secondary mirror symmetric about the axis,
wherein the primary and secondary mirror surfaces form an optical conjugate to the sample at the detector; and
c) acquiring and storing a signal according to light collected from the scanning beam.

20. The method of claim 19 further comprising forming an image according to the stored signals.

* * * * *